(12) United States Patent  (10) Patent No.: US 8,000,077 B2
Su et al.  (45) Date of Patent: Aug. 16, 2011

(54) DC NOISE ABSORBING DEVICE FOR PREVENTING SURGES AND REGULATING VOLTAGES

(75) Inventors: Jye-Chau Su, Taichung (TW); Jye-Yang Su, Houbi Township, Tainan County (TW)

(73) Assignee: Jye-Chau Su, Taichung (TW)

( * ) Notice: Subject to any disclaimer, the term of this patent is extended or adjusted under 35 U.S.C. 154(b) by 465 days.

(21) Appl. No.: 12/335,522

(22) Filed: Dec. 15, 2008

(65) Prior Publication Data

US 2010/0149702 A1 Jun. 17, 2010

(51) Int. Cl.
*H02H 1/04* (2006.01)
(52) U.S. Cl. .............................. 361/118; 361/117; 361/11
(58) Field of Classification Search .................... 361/56, 361/11, 117, 118, 220, 23, 136
See application file for complete search history.

(56) References Cited

U.S. PATENT DOCUMENTS 7,301,747 B2 * 11/2007 Su .................................. 361/118

* cited by examiner

Primary Examiner — Rexford Barnie
Assistant Examiner — Angela Brooks
(74) Attorney, Agent, or Firm — Chun-Ming Shih

(57) ABSTRACT

A DC noise absorbing device for preventing surges and regulating voltages includes a surge inhibitor, a fuse wire, a plurality of diodes, a plurality of Zener diodes, a plurality of diode alternate current switches (DIACs), a plurality of capacitors, and a circuit for indicating light emission, all of which are disposed on or between two wires respectively of positive voltage and negative voltage. The surge inhibitor and the fuse wire are connected in series on the wire of positive voltage; the plurality of diodes, the plurality of Zener diodes, the plurality of DIACs, the plurality of capacitors, which are identically specified, and the circuit for indicating light emission are orderly connected in parallel between the wires of positive voltage and negative voltage so as to form a staircase arrangement of cut-in switching voltages. The DC noise absorbing device provided by the present invention is connected in parallel with and between a DC supply and a DC load, for absorbing surges generated by switching the DC supply and the DC load, voltage fluctuations caused by load variation, serial surges rebounding from the DC load, and noises produced by external interference so that a stable operation and a promoted efficiency of the DC system can be achieved.

13 Claims, 13 Drawing Sheets

O-slow

O-2000

A-slow

A-2000

O-slow

O-2000

A-slow

A-2000

O-slow

O-2000

O-slow

O-2000

A-slow

A-2000

DC NOISE ABSORBING DEVICE FOR PREVENTING SURGES AND REGULATING VOLTAGES

BACKGROUND OF THE INVENTION

1. Field of the Invention

The present invention relates to a DC noise absorbing device for preventing surges and regulating voltages and, particularly, to a DC noise absorbing device connected in parallel with and between a DC supply and a DC load, for absorbing surges generated by switching the DC supply and the DC load, voltage fluctuations caused by load variation, serial surges rebounding from the DC load, and noises produced by external interference so that a stable operation and a promoted efficiency of the DC system can be achieved.

2. Descriptions of the Related Art

As the continuous innovation of technology, various novel electronic products have been developed out for employment. The electronic products are mostly driven by DC (direct-current) power and, therefore, the best effectiveness thereof may be achieved with a stable DC power. In the DC power, there can be voltage surges, ripples and other noises generated due to frequently switching, too numerous loads connected in series and temporal variation of the load, and even generated when using DC power to drive a motor. These surges, ripples and noises can communicate through power supply wires, resulting in interference among the loads and making destruction. Analysis with the Fourier series shows that the DC power has a series of harmonics accompanying the DC component. In particular, the surge is composed of harmonics with frequencies distributed in the full band. Different loads under the same DC power may undergo different currents and may have different impedances; thus, the load may resonate or interfere with certain harmonics, exhibiting decreased effectiveness. For example, in the mobile's electric system, which uses a single DC power, continuous surges generated when driving the motor and switching relays with large current passing, as well as the different impedances of different loads, can make the control signals interfered and, thus, influence the entire effectiveness of the mobile.

Moreover, a surge is a signal associated with voltage abruptly rising or dropping during an extreme short period. The extreme large voltage generated relates to an extreme strong electric field; that is, $$\Delta v = -\int_i^f \vec{E} \cdot d\vec{r} \text{ (in scalar form), or}$$

$$\vec{E} = -\nabla v \text{ (in vector form)}.$$

In general, an electronic device such as a transistor is made of semiconductor, which might have been doped with donors or acceptors as being P-typed or N-typed semiconductor, respectively. Easily, the strong field with the large voltage for the surge can break the covalent bonds of the semiconductor, leading to lattice breakdown. In a long term, the semiconductor will be damaged ultimately; the relevant electronic equipment will be damaged also. In the replacement of electronic equipment or parts, and in the consequent manufacture of electronic components, pollution is inevitable due to the waste and carbon dioxide produced. If such destructive noises can be absorbed or removed, the electronic component will have a much longer life and a more effective period; in this way, environmental protection will be promoted since the pollution will be inhibited.

The conventional voltage regulating device is characterized by that several capacitors differing in capacity are used so as to achieve voltage regulation. The major disadvantages are as follows.

An instantaneous high voltage can be generated by switching a power supply or a load. Since a DC capacitor has polarity, instantaneously loading a half-maximum voltage can cause the capacitor to be biased reversibly; consequently, the capacitor will be damaged or lead a shorten life.

Since each load has its characteristic impedance and is associated with a characteristic bandwidth, loads connected to a DC power supply tend to be influenced by various harmonics. For the low-frequency noises, a typical voltage regulating device has neither a function nor bandwidth design to make them decay.

In the disclosure of TW Patent No. I244445 and U.S. Pat. No. 7,301,747, which were issued to one of the present inventors, the claimed noise absorbing capacitors together with relevant components do not have a protective design in which diodes, Zener diodes and DIACs (diode alternate current switches) having different switching voltages are orderly connected in parallel and are disposed in a staircase form; they do not have a function of low-frequency noise decay, either. Therefore, the shorten life and increased rate of damage are possible.

Since the convention has such drawbacks as described above, it is hardly a good one. An improvement is required urgently.

In view of the above disadvantages derived from the conventional DC power supplies and DC loads, the present inventors, through a long-term study and practice, have set about the work of improvement and innovation that provides the present DC noise absorbing device for preventing surges and regulating voltages.

SUMMARY OF THE INVENTION

The primary objective of this invention is to provide a DC noise absorbing device for preventing surges and regulating voltages, the device being connected in parallel with and between a DC supply and a DC load, for absorbing surges generated by switching the DC supply and the DC load, voltage fluctuations caused by load variation, serial surges rebounding from the DC load, and noises produced by external interference so that a stable operation and a promoted efficiency of the DC system can be achieved.

Another objective of this invention is to provide a DC noise absorbing device for preventing surges and regulating voltages that can be applied to various products with DC power.

Yet a further objective of this invention is to provide a DC noise absorbing device for preventing surges and regulating voltages that is advantageously stable, long-life, easy to install and low-cost.

A direct-current (DC) noise absorbing device for preventing surges and regulating voltages that can achieve the objectives of the present invention comprises a surge inhibitor, a fuse wire, a plurality of diodes, a plurality of Zener diodes, a plurality of DIACs, a plurality of capacitors, and a circuit for indicating light emission, all of which are disposed on or between two wires respectively of positive voltage and negative voltage. According to the present invention, the surge inhibitor and the fuse wire are connected in series on the wire of positive voltage; the plurality of diodes, the plurality of Zener diodes, the plurality of diode alternate current switches (DIACs), the plurality of capacitors, which are identically specified, and the circuit for indicating light emission are orderly connected in parallel between the wires of positive voltage and negative voltage so that the device can achieve surge prevention and voltage regulation.

BRIEF DESCRIPTION OF THE DRAWINGS

The drawings disclose an illustrative embodiment of the present invention which serves to exemplify the various advantages and objects hereof, and are as follows.

DESCRIPTION OF THE PREFERRED EMBODIMENT

Figure 1:
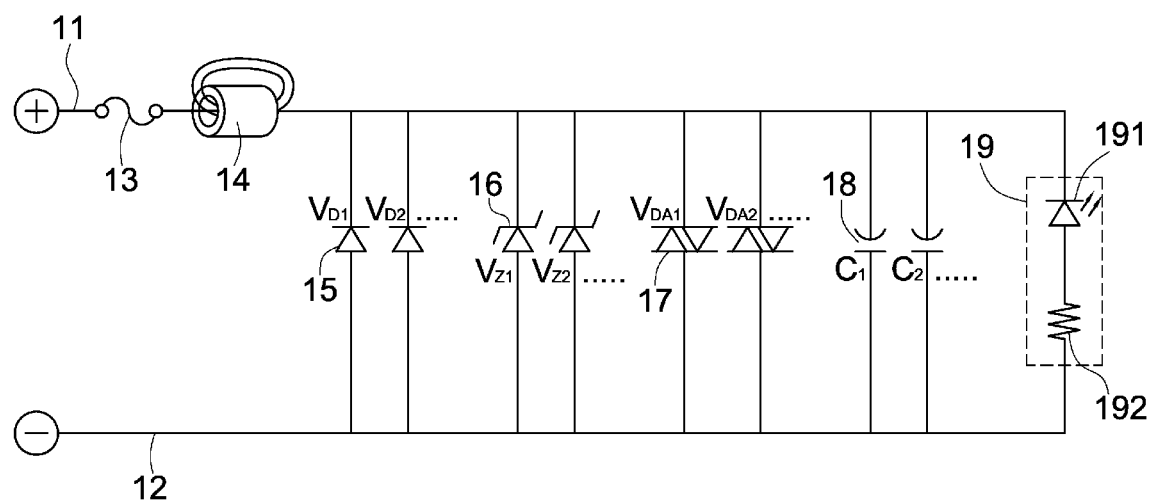
FIG. 1 is a schematic circuit-construction diagram for the DC noise absorbing device for preventing surges and regulating voltages according to the present invention.

Refer to FIG. 1, which is a schematic circuit-construction diagram for the DC noise absorbing device for preventing surges and regulating voltages according to the present invention. As shown in FIG. 1, the DC noise absorbing device 1 comprises elements disposed on or between two wires 11 and 12 respectively of positive voltage and negative voltage. The elements are described as follows.

A fuse wire 13 is disposed on the wire 11 of positive voltage.

A surge inhibitor 14 is disposed on the wire 11 of positive voltage and connected in series to the fuse wire 13, the surge inhibitor 14 being composed of a hollow cylinder with the wire 11 winding there through for a number of turns and subsequently penetrating to make a low inductance. That is, $|Z_L|=|jwL|=|wL|=|2\pi fL|$, L being the inductance, f the noise frequency, wherein the low inductance is adopted to inhibit surges with extremely high frequencies so as to protect the electronic components within the DC noise absorbing device.

A plurality of diodes 15, of which the diodes 15 are provided with different cut-in switching voltages, has the diodes 15 thereof connected in parallel and disposed between the wires 11 and 12 of positive voltage and negative voltage so as to form a staircase, reciprocally protective construction of cut-in switching voltages; the staircase construction, namely, has a staircase arrangement of the cut-in voltages. Each of the diodes 15 has an anode connected to the wire 11 of positive voltage and a cathode connected to the wire 12 of negative voltage, functioning to make a switch to the positive terminal so as to eliminate the negative half-maximum voltage of the noise, in case that the surge, AC ripple or AC noise has a negative half-maximum voltage larger than the cut-in voltages of the diodes 15. The staircase arrangement of the switching voltages of the diodes 15 is used for protection; that is, when the negative half-maximum voltage of the noise drops too rapidly, current will be cut in those diodes 15 with higher cut-in voltages so that those diodes 15 with lower cut-in voltages do not have any breakdown due to current flowing there through.

A plurality of Zener diodes 16, of which the Zener diodes 16 are provided with different cut-in switching voltages, has the Zener diodes 16 connected in parallel and disposed between the wires 11 and 12 of positive voltage and negative voltage so as to form a staircase, reciprocally protective construction of cut-in switching voltages Each of the Zener diodes 16 has an anode connected to the wire 11 of positive voltage and a cathode connected to the wire 12 of negative voltage, functioning to make a switch to the positive terminal so as to eliminate the positive half-maximum voltage of the noise, in case that the surge, AC ripple or AC noise has a positive half-maximum voltage larger than the cut-in voltages of the Zener diodes 16. The staircase arrangement of the switching voltages of the Zener diodes 16 is used for protection; that is, when the positive half-maximum voltage of the noise rises too rapidly, current will be cut in those Zener diodes 16 with higher cut-in voltages so that those Zener diodes 16 with lower cut-in voltages do not have any breakdown due to current flowing there through.

A plurality of DIACs 17, of which the DIACs 17 are provided with different cut-in switching voltages, has the DIACs 17 connected in parallel and disposed between the wires 11 and 12 of positive voltage and negative voltage so as to form a staircase, reciprocally protective construction of cut-in switching voltages. Each of the DIACs 17 has a second anode connected to the wire 11 of positive voltage and a first anode connected to the wire 12 of negative voltage, functioning to make a switch in case that the surge, AC ripple or AC noise has a negative half-maximum voltage exceeding the voltage allowable for the diodes 15 and a positive half-maximum voltage exceeding the voltage allowable for the Zener diodes 16, so as to eliminate the voltage of the noise and to protect the plurality of diodes 15 and the plurality of Zener diodes 16. The staircase arrangement of the switching voltages of the DIACs 17 is used for protection; that is, when the voltage of the noise rises too rapidly or drops too rapidly, current will be cut in those DIACs 17 with higher cut-in voltages so that those DIACs 17 with lower cut-in voltages do not have any breakdown due to current flowing there through.

A plurality of capacitors 18, of which the capacitors 18 are identically specified, has the capacitors 18 connected in parallel and disposed between the wires 11 and 12 of positive voltage and negative voltage. Each of the capacitors 18 has a positive terminal connected to the wire 11 of positive voltage and a negative terminal connected to the wire 12 of negative voltage, functioning to filter those voltage signals passing a range clamped by the plurality of diodes 15 and the plurality of Zener diodes 16. The plurality of capacitors 18 has an impedance formed thereof. That is, $|Z_C|=|1/jwNC|=|1/j2\pi fNC|=1/j2\pi fNC$, f being the noise frequency, N the number of the capacitors in parallel, such that the noise will be switched to the negative terminal if the impedance becomes small with the rise of the frequency of the noise, and that the bandwidth of noise decay can be specified by adjusting the number N. By the plurality of diodes 15, which has staircase cut-in switching voltages, the capacitors 18 can be protected from being destructed by the negative half-maximum reversible over voltage of the noise; by the plurality of Zener diodes 16, which has staircase cut-in switching voltages, the capacitors 18 can be protected from being destructed by the positive half-maximum over voltage of the noise.

A circuit 19 for indicating light emission consists of an LED (light emitting diode) lamp 191, and a resistor 192. The LED lamp 191 has an anode connected to the wire 11 of positive voltage and a cathode connected to a terminal of the resistor 192, while the resistor 192 has another terminal connected to the wire 12 of negative voltage.

The DC noise absorbing device, according to the present invention, is connected in parallel with and between a DC supply and a DC load, for absorbing surges generated by switching the DC supply and the DC load, voltage fluctuations caused by load variation, serial surges rebounding from the DC load, and noises produced by external interference so that a stable operation and a promoted efficiency of the DC system can be achieved.

Figure 2A:
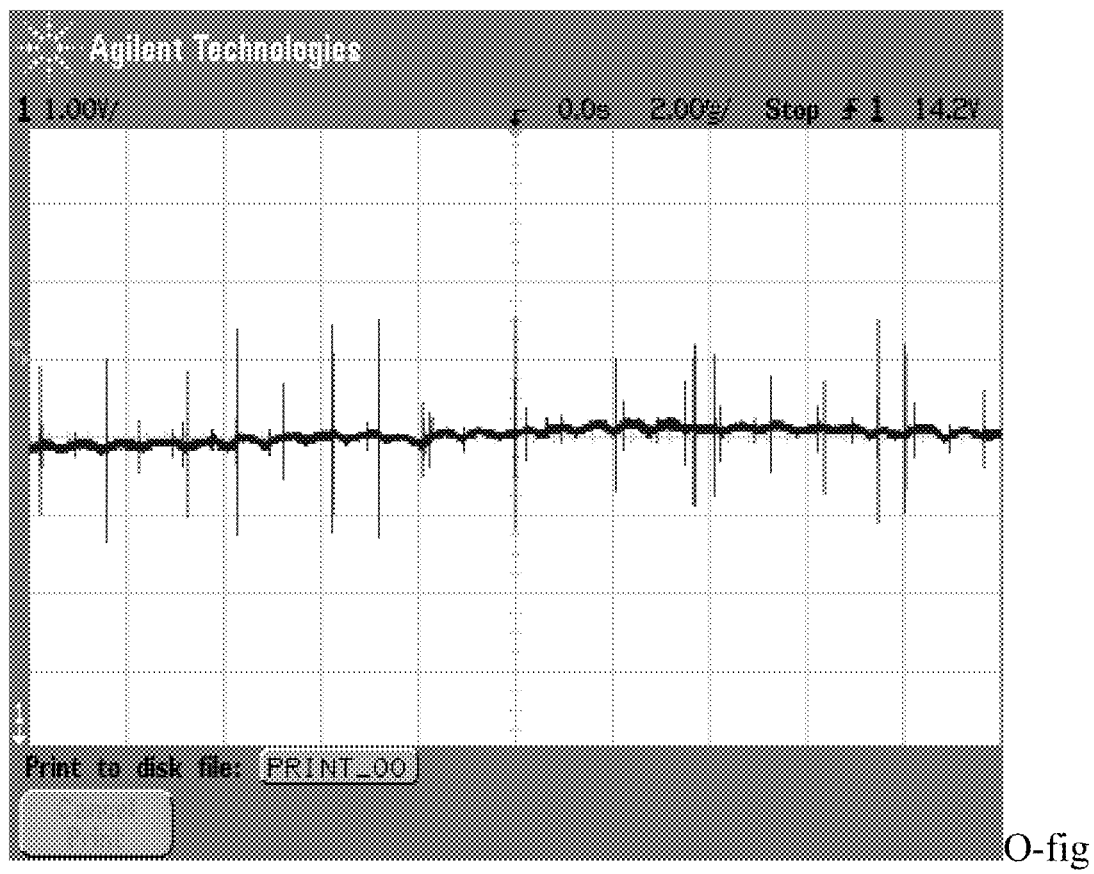
FIG. 2A is a conventional waveform graph for the voltage between the positive and the negative terminals of a power supply for a fan in a mobile, to which the noise absorber of the present invention has not been mounted.
Figure 2B:
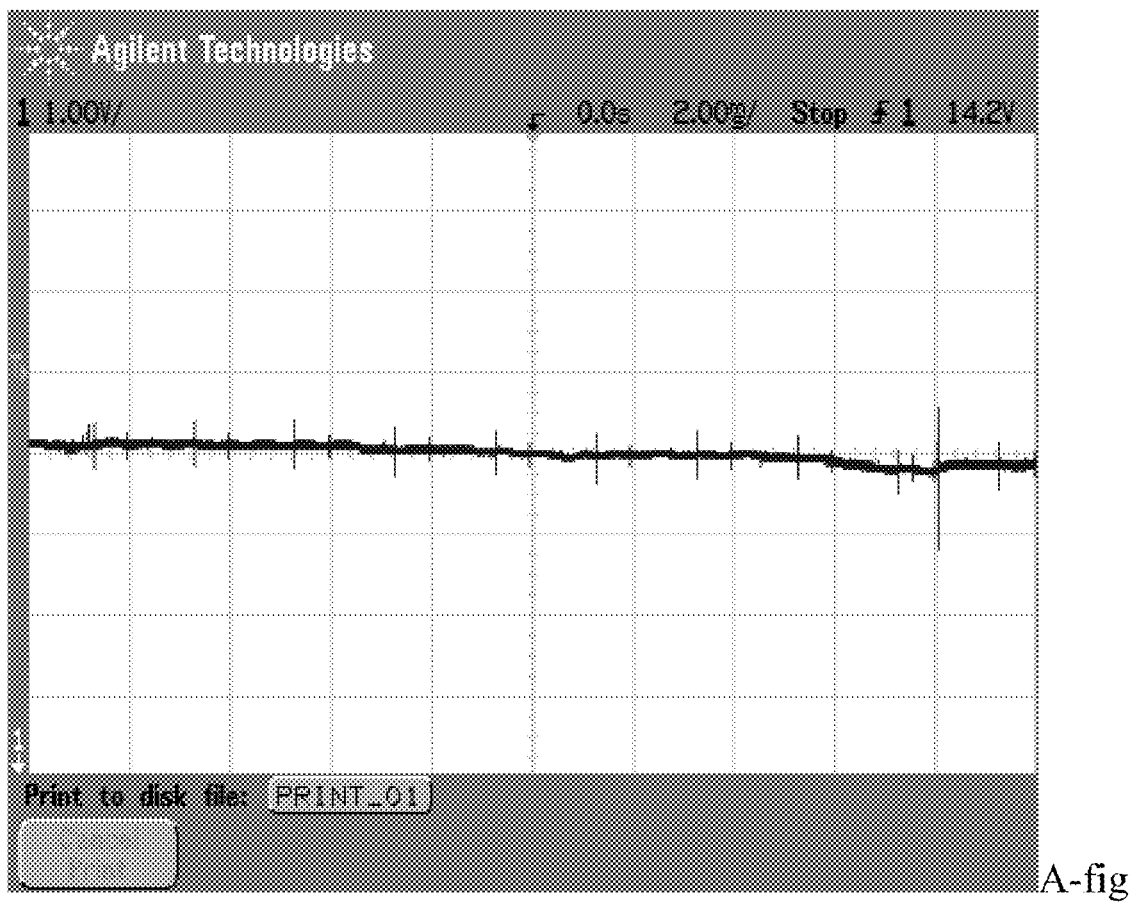
FIG. 2B is a waveform graph for the voltage between the positive and the negative terminals of a power supply for a fan in a mobile, to which the present invention is applied.

Refer to FIG. 2A and FIG. 2B, which are, respectively, a conventional waveform graph for the voltage between the positive and the negative terminals of a power supply for a fan in a mobile, to which the noise absorber of the present invention has not been mounted, and a waveform graph for the voltage between the positive and the negative terminals of a power supply for a fan in a mobile, to which the present invention is applied. A comparison made from FIG. 2A and FIG. 2B shows that the reduction of noise is effective when the present invention is applied to the positive and the negative terminals of the power supply for the fan, so that the DC power quality can be promoted.

Figure 3A:
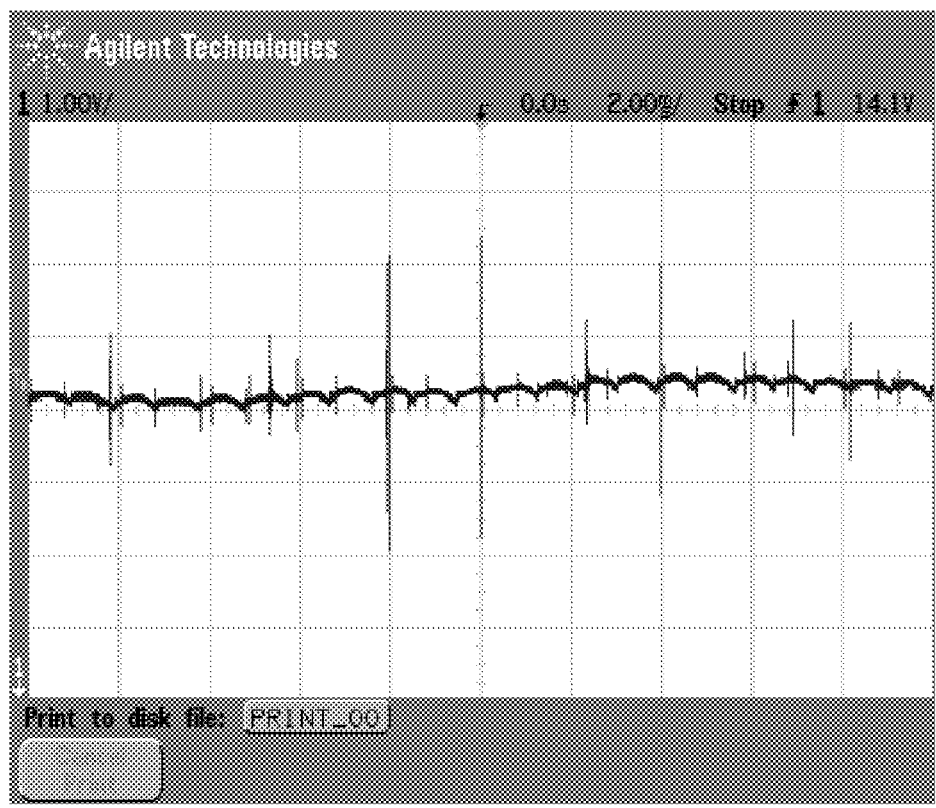
FIG. 3A is a conventional waveform graph for the voltage between the positive and the negative terminals of a power supply for a battery in a mobile, to which the noise absorber of the present invention has not been mounted.
Figure 3A:
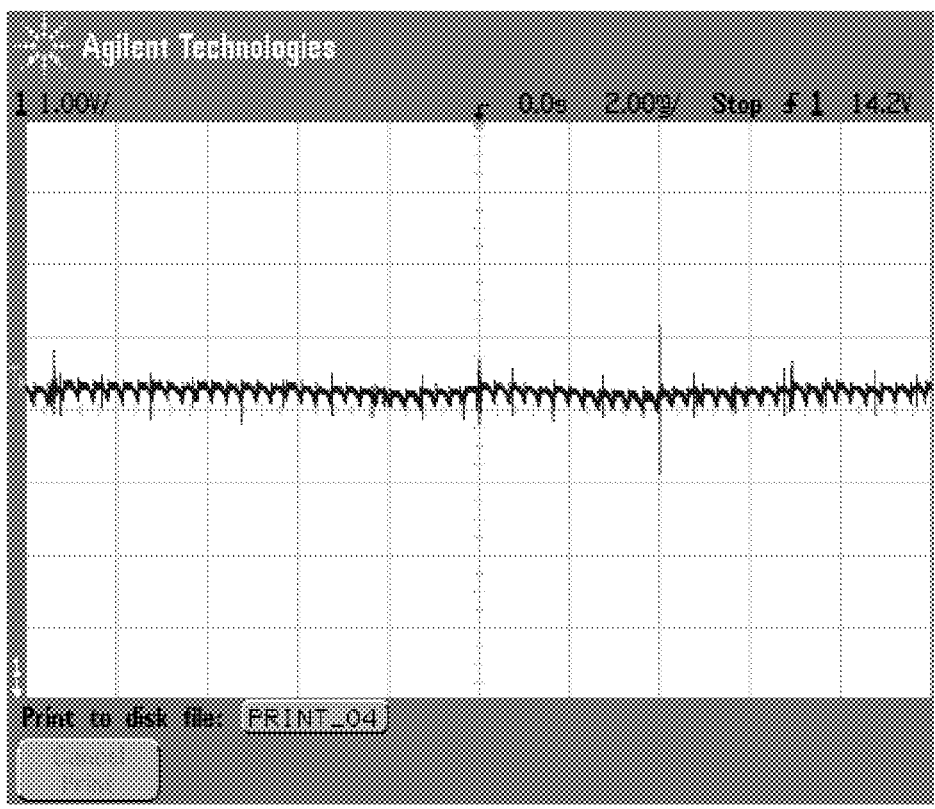
Figure 3B:
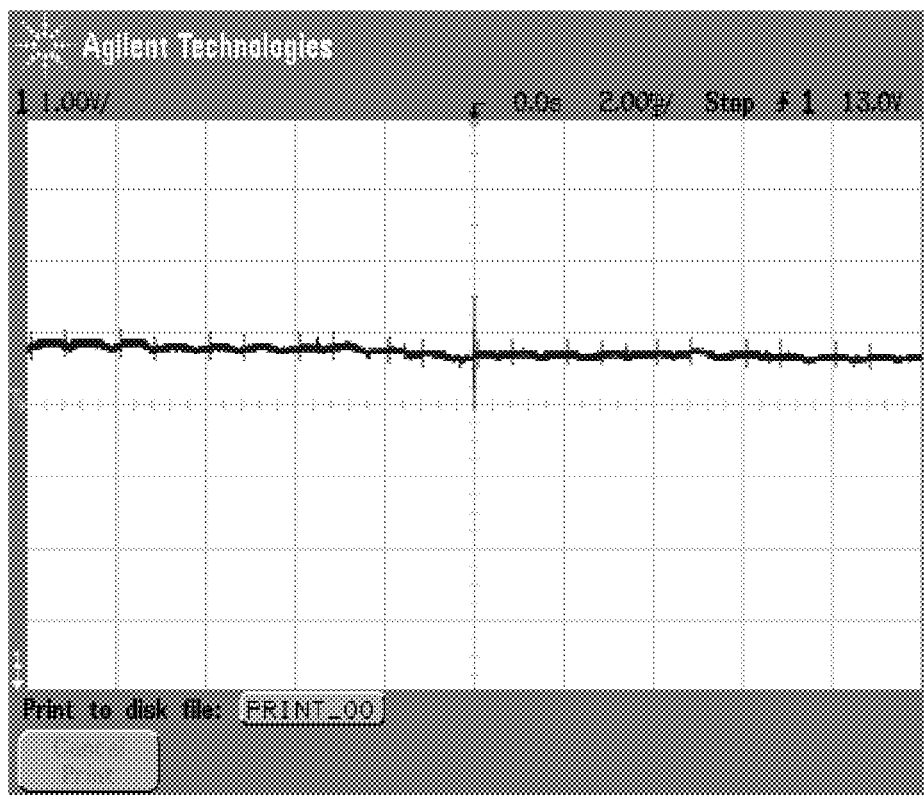
FIG. 3B is a waveform graph for the voltage between the positive and the negative terminals of a power supply for a battery in a mobile, to which the present invention is applied.
Figure 3B:
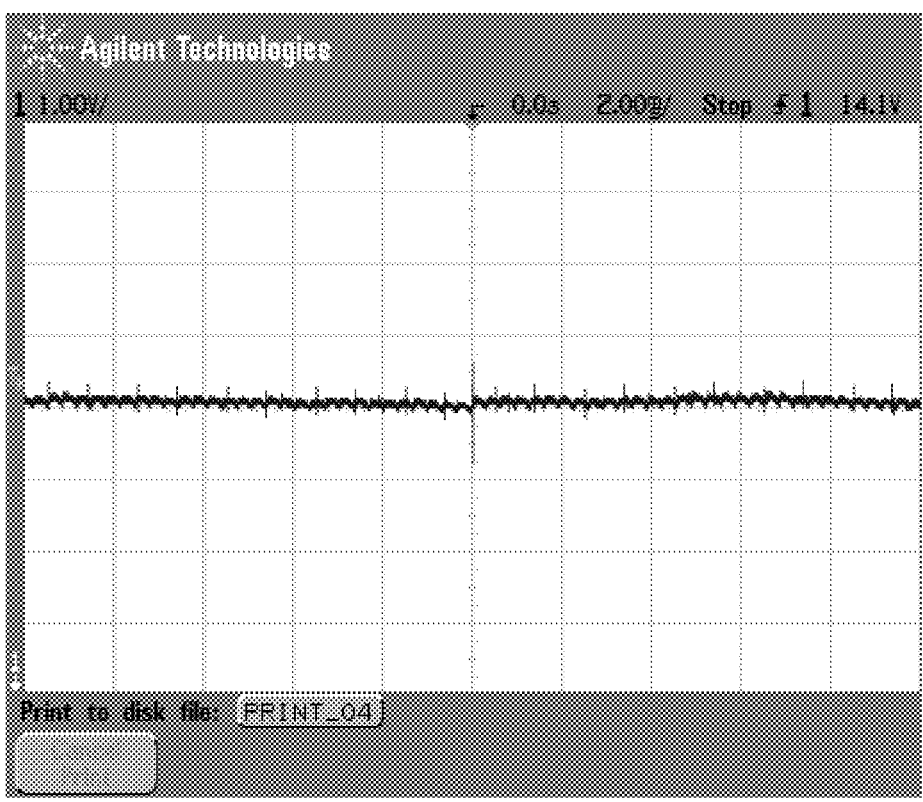

Refer to FIG. 3A and FIG. 3B, which are, respectively, a conventional waveform graph for the voltage between the positive and the negative terminals of a power supply for a battery in a mobile, to which the noise absorber of the present invention has not been mounted, and a waveform graph for the voltage between the positive and the negative terminals of a power supply for a battery in a mobile, to which the present invention is applied. A comparison made from FIG. 3A and FIG. 3B shows that the reduction of noise is effective when the present invention is applied to the positive and the negative terminals of the power supply for the battery, so that the DC power quality can be promoted.

Figure 4A:
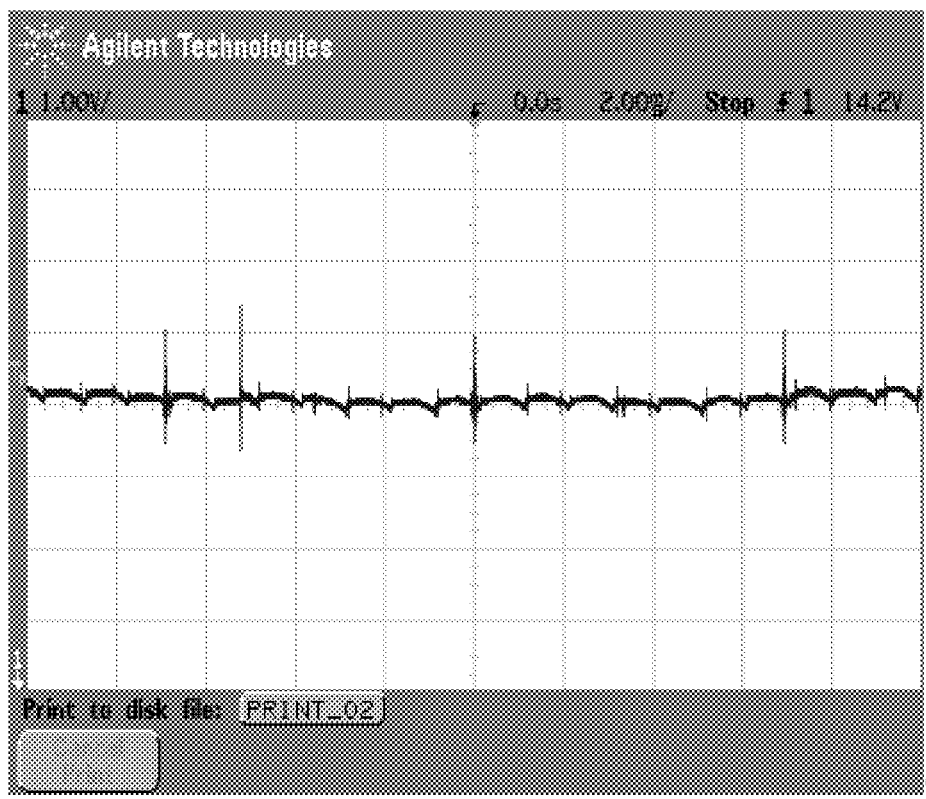
FIG. 4A is a conventional waveform graph for the voltage between the positive and the negative terminals of a power supply for a generator in a mobile, to which the noise absorber of the present invention has not been mounted.
Figure 4A:
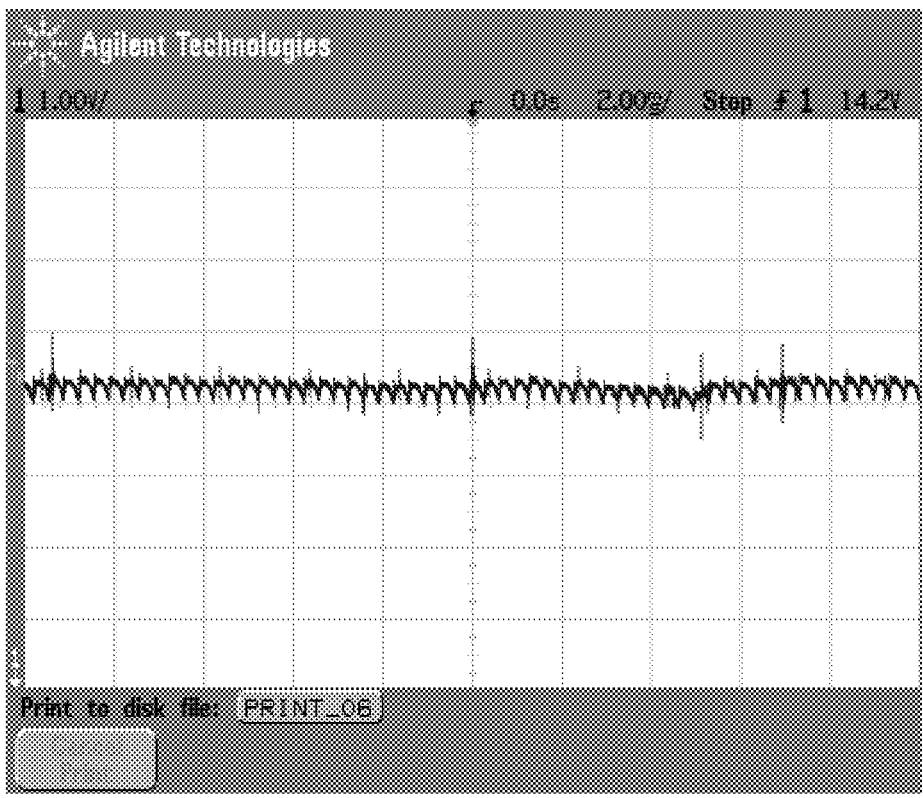
Figure 4B:
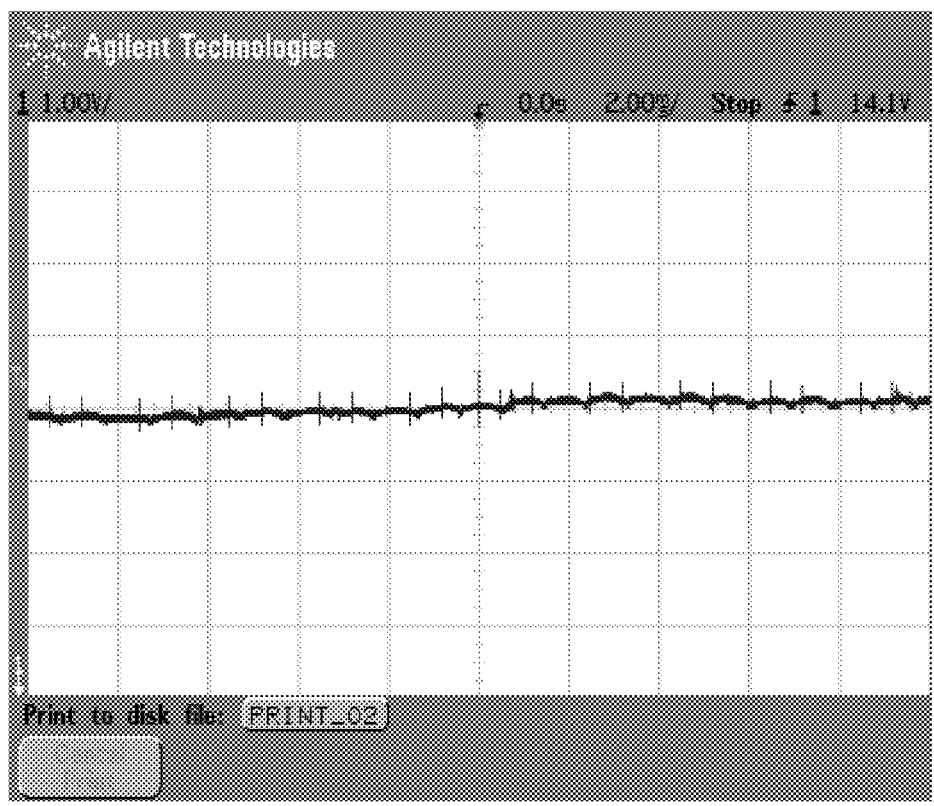
FIG. 4B is a waveform graph for the voltage between the positive and the negative terminals of a power supply for a generator in a mobile, to which the present invention is applied.
Figure 4B:
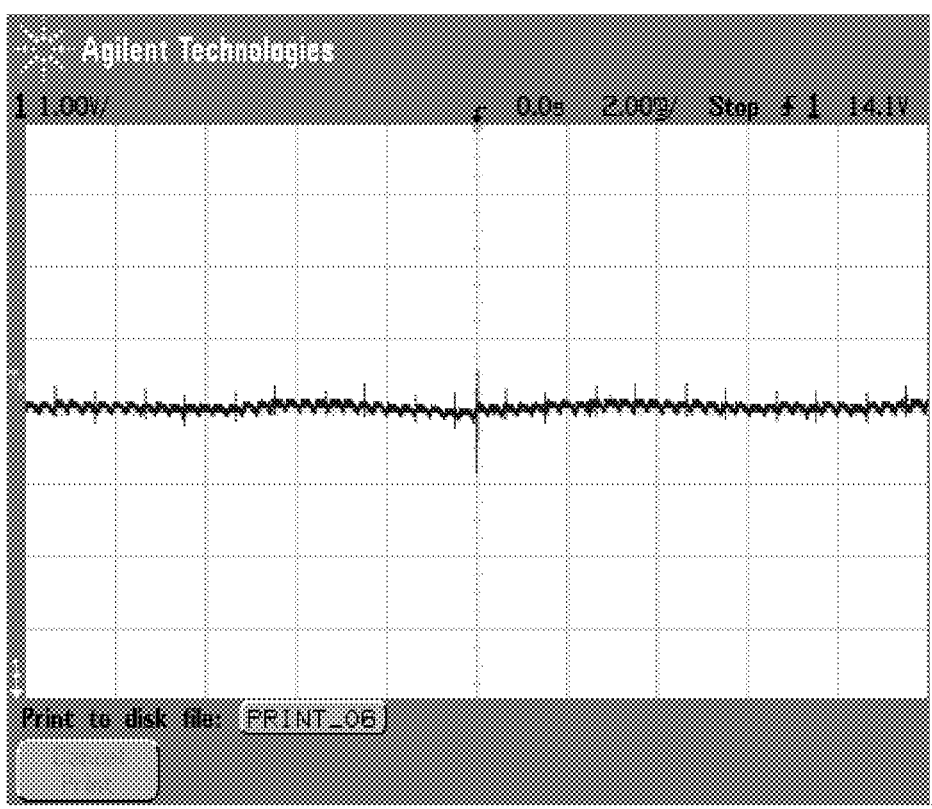

Refer to FIG. 4A and FIG. 4B, which are, respectively, a conventional waveform graph for the voltage between the positive and the negative terminals of a power supply for a generator in a mobile, to which the noise absorber of the present invention has not been mounted, and a waveform graph for the voltage between the positive and the negative terminals of a power supply for a generator in a mobile, to which the present invention is applied. A comparison made from FIG. 4A and FIG. 4B shows that the reduction of noise is effective when the present invention is applied to the positive and the negative terminals of the power supply for the generator, so that the DC power quality can be promoted.

Figure 5A:
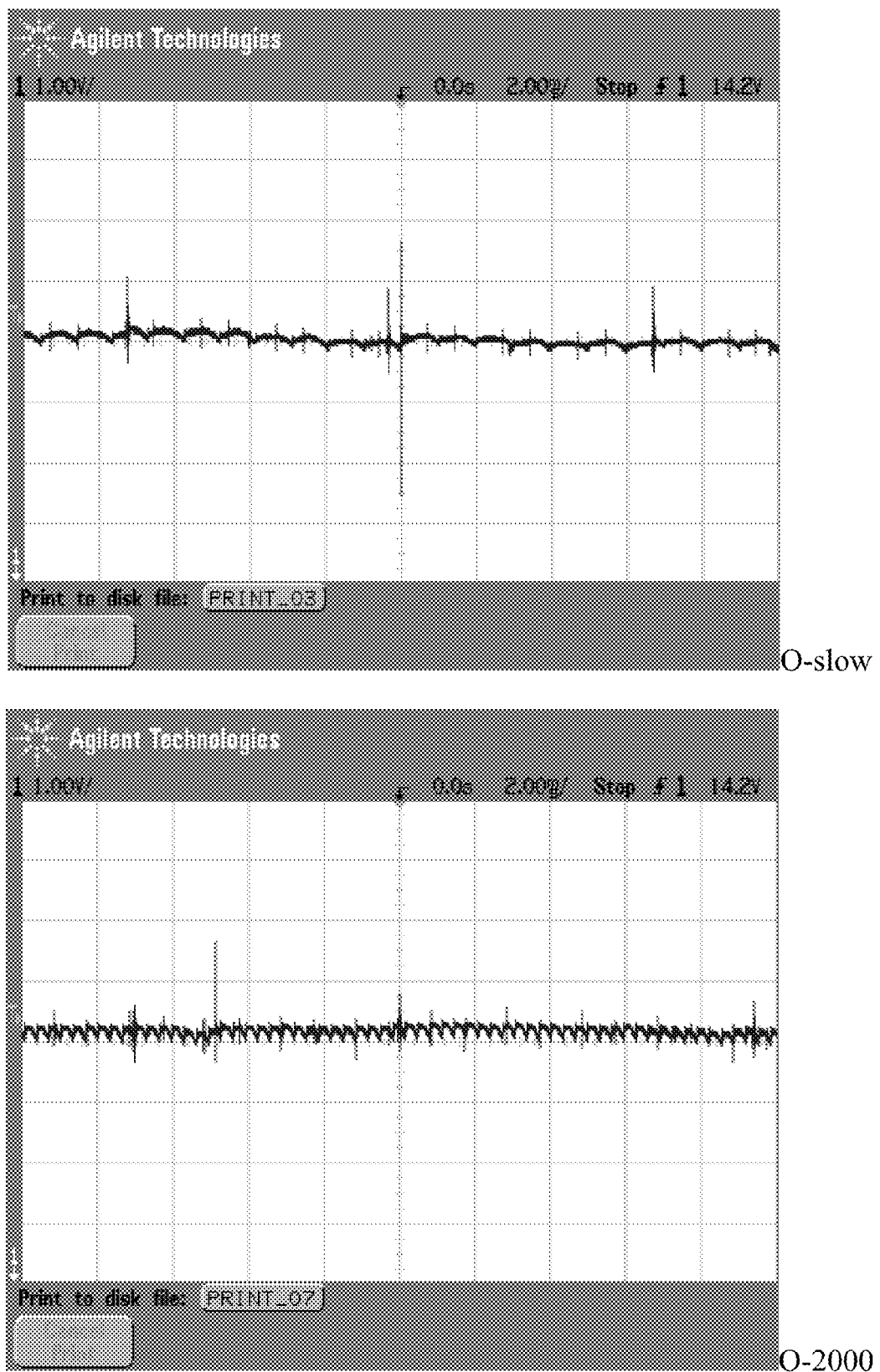
FIG. 5A is a conventional waveform graph for the voltage between the positive and the negative terminals of a power supply for an ABS (anti-lock brake system) in a mobile, to which the noise absorber of the present invention has not been mounted.
Figure 5B:
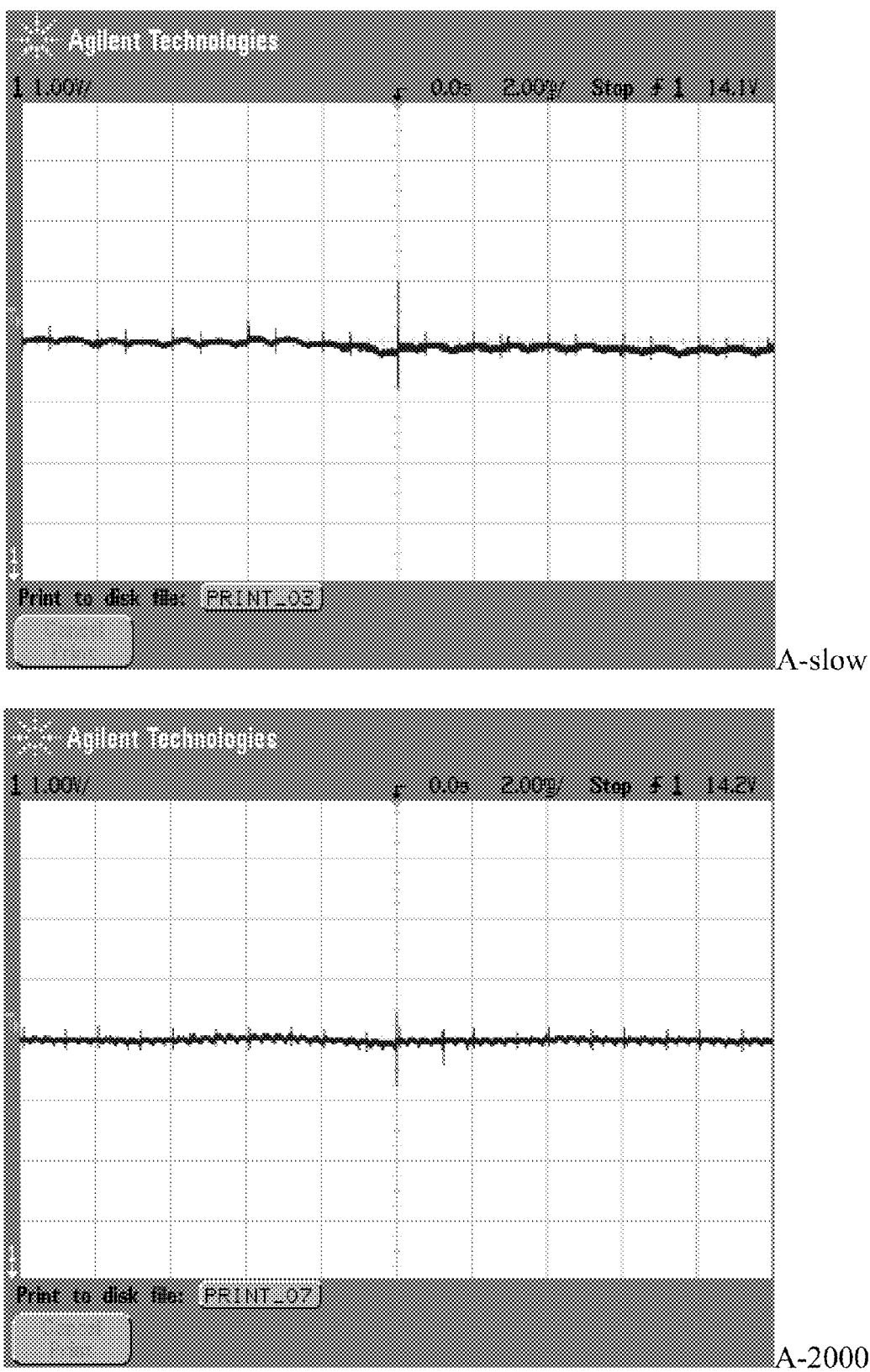
FIG. 5B is a waveform graph for the voltage between the positive and the negative terminals of a power supply for an ABS in a mobile, to which the present invention is applied.

Refer to FIG. 5A and FIG. 5B, which are, respectively, a conventional waveform graph for the voltage between the positive and the negative terminals of a power supply for an ABS in a mobile, to which the noise absorber of the present invention has not been mounted, and a waveform graph for the voltage between the positive and the negative terminals of a power supply for an ABS in a mobile, to which the present invention is applied. A comparison made from FIG. 5A and FIG. 5B shows that the reduction of noise is effective when the present invention is applied to the positive and the negative terminals of the power supply for the ABS, so that the DC power quality can be promoted.

Figure 6A:
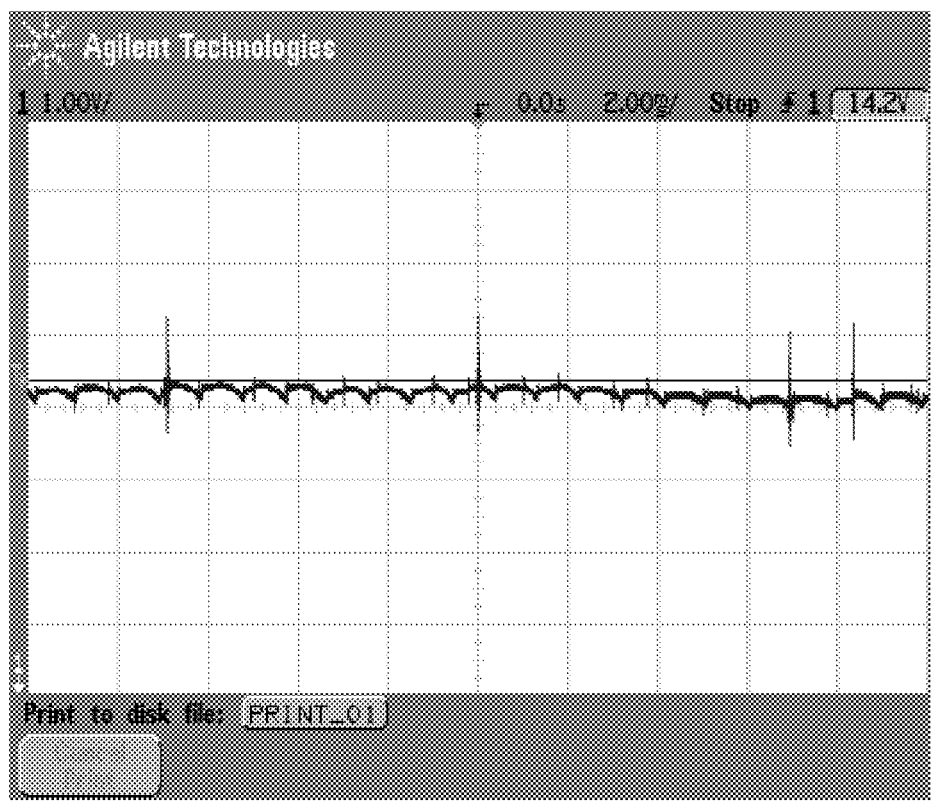
FIG. 6A is a conventional waveform graph for the voltage between the positive and the negative terminals of a power supply for an engine cover in a mobile, to which the noise absorber of the present invention has not been mounted.
Figure 6A:
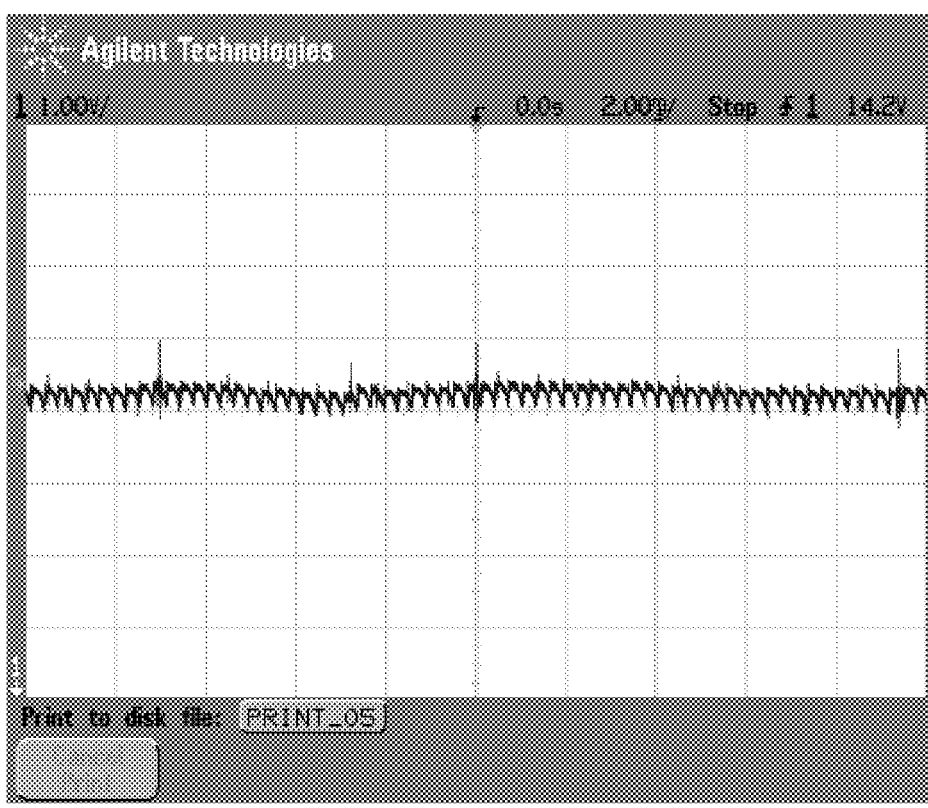
Figure 6B:
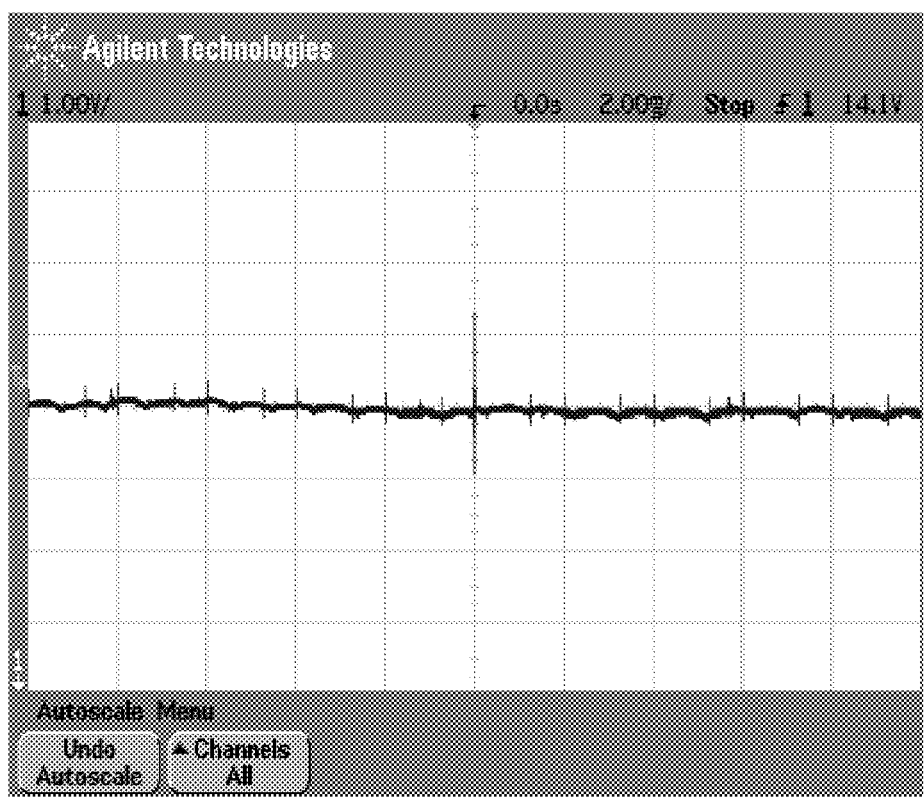
FIG. 6B is a waveform graph for the voltage between the positive and the negative terminals of a power supply for an engine cover in a mobile, to which the present invention is applied.
Figure 6B:
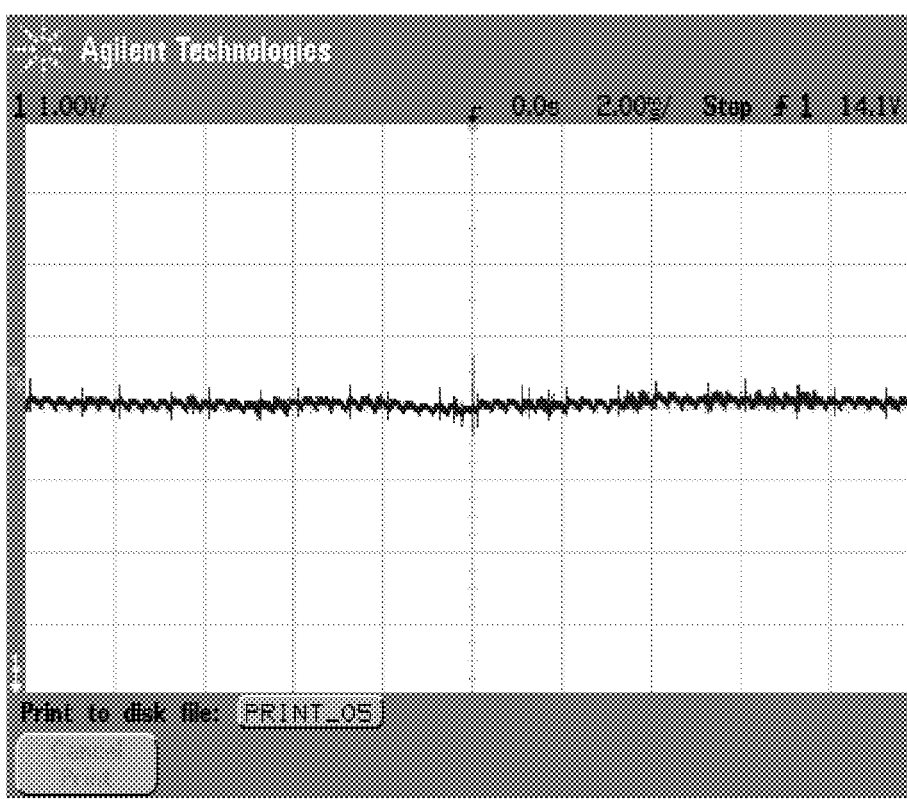

Refer to FIG. 6A and FIG. 6B, which are, respectively, a conventional waveform graph for the voltage between the positive and the negative terminals of a power supply for an engine cover in a mobile, to which the noise absorber of the present invention has not been mounted, and a waveform graph for the voltage between the positive and the negative terminals of a power supply for an engine cover in a mobile, to which the present invention is applied. A comparison made from FIG. 6A and FIG. 6B shows that the reduction of noise is effective when the present invention is applied to the positive and the negative terminals of the power supply for the engine cover, so that the DC power quality can be promoted.

Figure 7A:
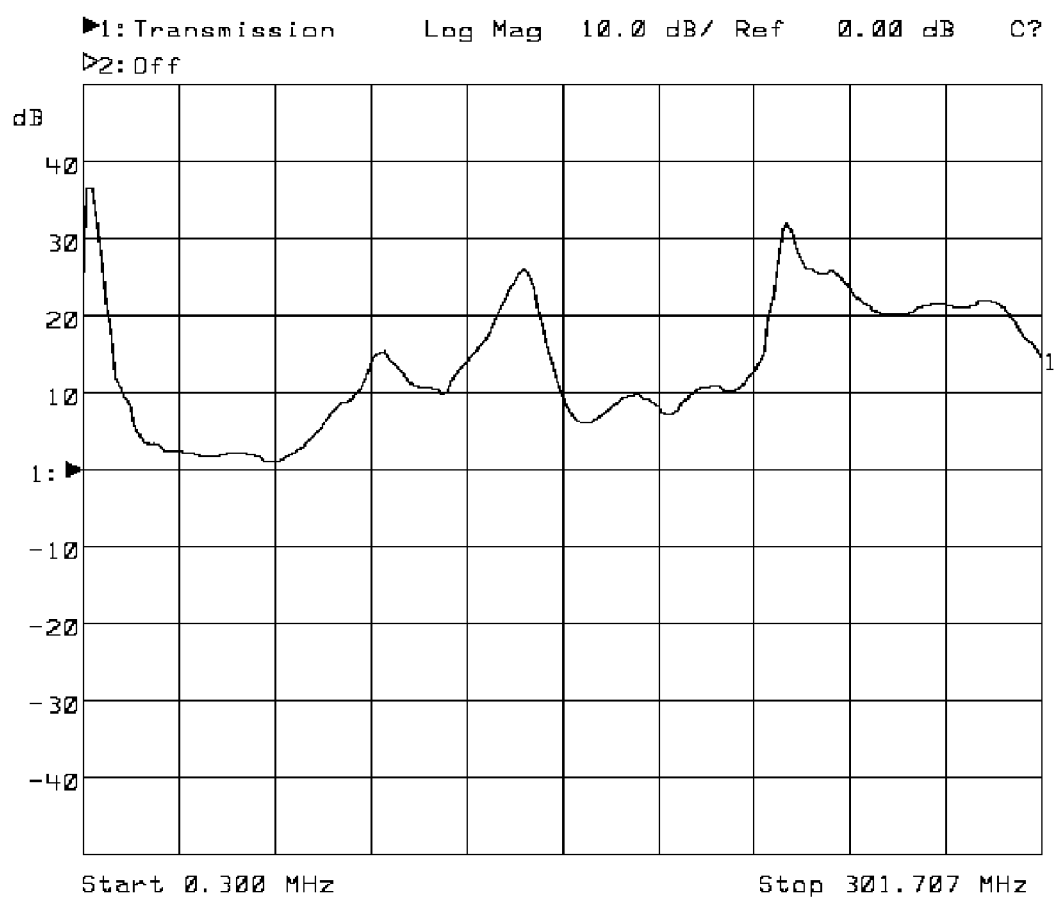
FIG. 7A is a scanning frequency graph for the case that the noise absorber of the present invention has not been mounted.
Figure 7B:
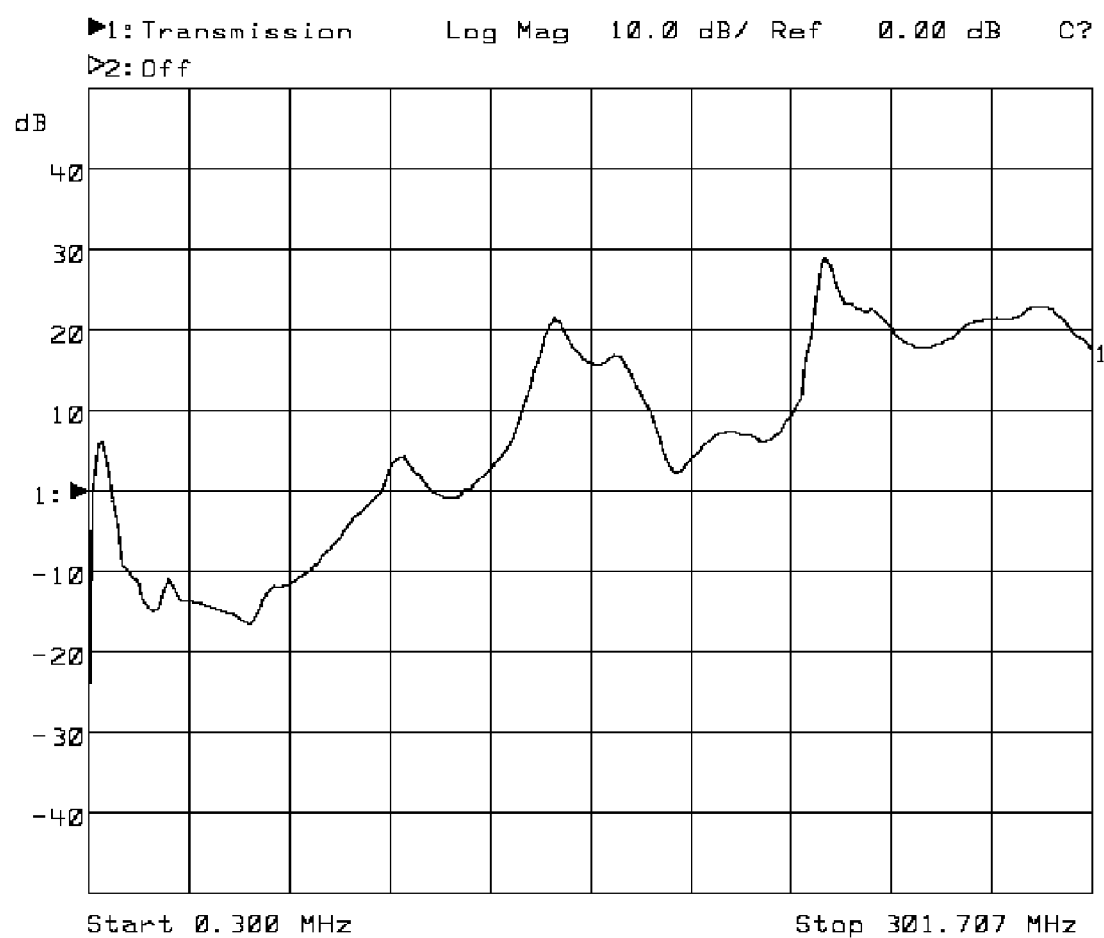
FIG. 7B is a scanning frequency graph for the case that the DC noise absorbing device for preventing surges and regulating voltages of the present invention has been mounted.

Refer to FIG. 7A and FIG. 7B, which are, respectively, a scanning frequency graph for the case that the noise absorber of the present invention has not been mounted, and a scanning frequency graph for the case that the DC noise absorbing device for preventing surges and regulating voltages of the present invention has been mounted. A comparison, with respect to the low-frequency noise decay, made from FIG. 7A and FIG. 7B shows that the low-frequency noise can decay by up to 30 dB when the present invention is applied; thus, the present invention exhibits the best performance.

The DC noise absorbing device for preventing surges and regulating voltages provided by the present invention as compared with conventional technologies has the following advantages.

1. The DC noise absorbing device, connected in parallel with and between a DC supply and a DC load, can be used for absorbing noises generated by switches of the DC supply and the DC load, load variation, and external interference so that a stable operation and a promoted efficiency of the DC system can be achieved.

2. The DC noise absorbing device can be applied to various products with DC power.

3. The DC noise absorbing device adopts a design in which the bandwidth of low-frequency noise decay is adjustable and, therefore, is more suitable for various DC loads.

4. The DC noise absorbing device is advantageously stable, long-life, easy to install and low-cost.

Many changes and modifications in the above described embodiment of the invention can, of course, be carried out without departing from the scope thereof. Accordingly, to promote the progress in science and the useful arts, the invention is disclosed and is intended to be limited only to the scope of the appended claims.

What is claimed is:

1. A direct-current (DC) noise absorbing device for preventing surges and regulating voltages, which includes elements on or between two wires respectively of positive voltage and negative voltage, the DC noise absorbing device comprising:

a surge inhibitor, disposed on the wire of positive voltage, the surge inhibitor having a hollow cylinder with the wire of positive voltage winding therethrough for a number of turns and subsequently penetrating to make a low inductance for inhibiting surges with extremely high frequencies so as to protect electronic components within the DC noise absorbing device;

a plurality of diodes, the diodes being provided with different cut-in switching voltages, and connected in parallel and disposed between the wires of positive voltage and negative voltage so as to form a first staircase, reciprocally protective construction of cut-in switching voltages;

a plurality of Zener diodes, the Zener diodes being provided with different cut-in switching voltages, and connected in parallel and disposed between the wires of positive voltage and negative voltage so as to form a second staircase, reciprocally protective construction of cut-in switching voltages;

a plurality of diode alternate current switches (DIACs), the DIACs being provided with different cut-in switching voltages, and connected in parallel and disposed between the wires of positive voltage and negative voltage so as to form a third staircase, reciprocally protective construction of cut-in switching voltages; and a plurality of capacitors, the capacitors being identically specified, and connected in parallel and disposed between the wires of positive voltage and negative voltage.

2. The DC noise absorbing device for preventing surges and regulating voltages of claim 1, wherein the DC noise absorbing device further comprises a fuse wire, the fuse wire being disposed on the wire of positive voltage.

3. The DC noise absorbing device for preventing surges and regulating voltages of claim 1, wherein the DC noise absorbing device further comprises a circuit for indicating light emission, the circuit for indicating light emission including a light emitting diode lamp and a resistor, and the light emitting diode lamp has an anode connected to the wire of positive voltage and a cathode connected to a terminal of the resistor, while the resistor has another terminal connected to the wire of negative voltage.

4. The DC noise absorbing device for preventing surges and regulating voltages of claim 1, wherein the diode has an anode connected to the wire of positive voltage and a cathode connected to the wire of negative voltage, functioning to make a switch to the positive terminal so as to eliminate the negative half-maximum voltage of the noise, in case that the surge, AC ripple or AC noise has a negative half-maximum voltage larger than the cut-in voltages of the diodes.

5. The DC noise absorbing device for preventing surges and regulating voltages of claim 1, wherein the staircase arrangement of the switching voltages of the diodes is used for current to be cut in those diodes with higher cut-in voltages when the negative half-maximum voltage of the noise drops too rapidly, so that those diodes with lower cut-in voltages do not have any breakdown due to current flowing there through.

6. The DC noise absorbing device for preventing surges and regulating voltages of claim 1, wherein the Zener diode has an anode connected to the wire of positive voltage and a cathode connected to the wire of negative voltage, functioning to make a switch to the positive terminal so as to eliminate the positive half-maximum voltage of the noise, in case that the surge, AC ripple or AC noise has a positive half-maximum voltage larger than the cut-in voltages of the Zener diodes.

7. The DC noise absorbing device for preventing surges and regulating voltages of claim 1, wherein the staircase arrangement of the switching voltages of the Zener diodes is used for current to be cut in those Zener diodes with higher cut-in voltages when the positive half-maximum voltage of the noise rises too rapidly, so that those Zener diodes with lower cut-in voltages do not have any breakdown due to current flowing there through.

8. The DC noise absorbing device for preventing surges and regulating voltages of claim 1, wherein the DIAC has a second anode connected to the wire of positive voltage and a first anode connected to the wire of negative voltage, functioning to make a switch so as to eliminate the voltage of the noise and to protect the plurality of diodes and the plurality of Zener diodes, in case that the surge, AC ripple or AC noise has a negative half-maximum voltage exceeding the voltage allowable for the diodes and a positive half-maximum voltage exceeding the voltage allowable for the Zener diodes.

9. The DC noise absorbing device for preventing surges and regulating voltages of claim 1, wherein the staircase arrangement of the switching voltages of the DIACs is used for current to be cut in those DIACs with higher cut-in voltages when the voltage of the noise rises too rapidly or drops too rapidly, so that those DIACs with lower cut-in voltages do not have any breakdown due to current flowing there through.

10. The DC noise absorbing device for preventing surges and regulating voltages of claim 1, wherein the capacitor has a positive terminal connected to the wire of positive voltage and a negative terminal connected to the wire of negative voltage, functioning to filter those voltage signals passing a range clamped by the plurality of diodes and the plurality of Zener diodes, and the plurality of capacitors has an impedance formed thereof, such that the noise will be switched to the negative terminal if the impedance becomes small with the rise of the frequency of the noise.

11. The DC noise absorbing device for preventing surges and regulating voltages of claim 10, wherein the capacitor has a positive terminal connected to the wire of positive voltage and a negative terminal connected to the wire of negative voltage, so that the bandwidth of noise decay can be specified by adjusting the number of the capacitors.

12. The DC noise absorbing device for preventing surges and regulating voltages of claim 1, wherein the staircase cut-in switching voltages of the plurality of diodes protect the capacitors from being destructed by the negative half-maximum reversible over voltage of the noise.

13. The DC noise absorbing device for preventing surges and regulating voltages of claim 1, wherein the staircase cut-in switching voltages of the plurality of Zener diodes protect the capacitors from being destructed by the positive half-maximum over voltage of the noise.

* * * * *